(12) United States Patent
Sahlin

(10) Patent No.: US 10,727,882 B2
(45) Date of Patent: Jul. 28, 2020

(54) TRAJECTORY MODIFICATION TECHNIQUE FOR POLAR TRANSMITTER

(71) Applicant: Intel IP Corporation, Santa Clara, CA (US)

(72) Inventor: Staffan Sahlin, Munich (DE)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 16/134,210

(22) Filed: Sep. 18, 2018

(65) Prior Publication Data

US 2019/0260404 A1    Aug. 22, 2019

Related U.S. Application Data

(60) Continuation of application No. 15/243,132, filed on Aug. 22, 2016, now Pat. No. 10,103,758, which is a division of application No. 14/496,519, filed on Sep. 25, 2014, now Pat. No. 9,425,834, which is a
(Continued)

(51) Int. Cl.
| | |
|---|---|
| *H04B 1/04* | (2006.01) |
| *H04L 7/033* | (2006.01) |
| *H04L 27/20* | (2006.01) |
| *H04L 12/26* | (2006.01) |
| *H04L 27/26* | (2006.01) |

(52) U.S. Cl.
CPC ............ *H04B 1/0483* (2013.01); *H04B 1/04* (2013.01); *H04L 7/0331* (2013.01); *H04L 27/20* (2013.01); *H04L 43/16* (2013.01); *H04B 1/0475* (2013.01); *H04L 27/2626* (2013.01)

(58) Field of Classification Search
CPC .......................... H04L 27/2626; H04B 1/0475
See application file for complete search history.

(56) References Cited

U.S. PATENT DOCUMENTS

| | | |
|---|---|---|
| 8,131,229 B1 | 3/2012 | Wilson et al. |
| 9,425,834 B2 | 8/2016 | Sahlin |
| 10,103,758 B2 | 10/2018 | Sahlin |
| | (Continued) | |

FOREIGN PATENT DOCUMENTS

| | | |
|---|---|---|
| CN | 103477583 A | 12/2013 |
| CN | 105471447 A | 4/2016 |
| | (Continued) | |

OTHER PUBLICATIONS

U.S. Appl. No. 14/496,519, now U.S. Pat. No. 9,425,834, filed Sep. 25, 2014, Trajectory Modification Technique for Polar Transmitter.
(Continued)

*Primary Examiner* — Ross Varndell
(74) *Attorney, Agent, or Firm* — Kowert, Hood, Munyon, Rankin & Goetzel, P.C.

(57) ABSTRACT

This application discussed trajectory modification techniques for polar transmission architectures. In an example, a method can include receiving a first sample, determining an absolute phase angle change between the first sample and a third sample, and if the first angle change is greater than a threshold phase angle, adjusting phase information of a second sample to provide a modified second sample such that a trajectory associated with the first sample, the modified second sample and the third sample passes through an origin. In an example, the second sample can be received prior to receiving the first sample, and the third sample can be received prior to receiving the second sample.

19 Claims, 4 Drawing Sheets

Related U.S. Application Data continuation-in-part of application No. 13/763,760, filed on Feb. 11, 2013, now Pat. No. 8,923,434.

(56) References Cited

U.S. PATENT DOCUMENTS

| | | |
|---|---|---|
| 2008/0002788 A1 | 1/2008 | Akhtar et al. |
| 2010/0264996 A1 | 10/2010 | Chang et al. |
| 2011/0103508 A1 | 5/2011 | Mu et al. |
| 2012/0063536 A1 | 3/2012 | Bode et al. |
| 2014/0226756 A1 | 8/2014 | Menkhoff et al. |
| 2016/0094251 A1 | 3/2016 | Sahlin et al. |
| 2017/0047955 A1 | 2/2017 | Sahlin |

FOREIGN PATENT DOCUMENTS

| | | |
|---|---|---|
| DE | 102015011009 A1 | 3/2016 |
| TW | 201132009 A1 | 9/2011 |
| TW | 201622390 A | 8/2015 |
| WO | WO-2013117698 A1 | 8/2013 |

OTHER PUBLICATIONS

U.S. App. No. 15/243,132, now U.S. Pat. No. 10,103,758, filed Aug. 22, 2016, Trajectory Modification Technique for Polar Transmitter.

"U.S. Appl. No. 14/496,519, Non Final Office Action dated Oct. 8, 2015", 10 pgs.

"U.S. Appl. No. 14/496,519, Notice of Allowance dated Apr. 26, 2016", 8 pgs.

"U.S. Appl. No. 14/496,519, Response filed Jan. 8, 2016 to Non Final Office Action dated Oct. 8, 2015", 10 pgs.

"U.S. Appl. No. 14/496,519, Response filed Jul. 16, 2015 to Restriction Requirement dated May 22, 2015", 7 pgs.

"U.S. Appl. No. 14/496,519, Restriction Requirement dated May 22, 2015", 6 pgs.

"U.S. Appl. No. 15/243,132, Non Final Office Action dated Dec. 29, 2017", 7 pgs.

"U.S. Appl. No. 15/243,132, Notice of Allowance dated Jun. 11, 2018", 8 pgs.

"U.S. Appl. No. 15/243,132, Preliminary Amendment filed Nov. 2, 2016", 7 pgs.

"U.S. Appl. No. 15/243,132, Response filed Oct. 25, 2017 to Restriction Requirement dated Aug. 25, 2017", 7 pgs.

"U.S. Appl. No. 15/243,132, Restriction Requirement dated Aug. 25, 2017", 6 pgs.

"Chinese Application Serial No. 201510523410.9, Office Action dated Jan. 2, 2018", w/ Concise Statement of Relevance, 4 pgs.

"Chinese Application Serial No. 201510523410.9, Office Action dated Jun. 12, 2017", W/out English Translation, 6 pgs.

"Chinese Application Serial No. 201510523410.9, Response filed Mar. 15, 2018 to Office Action dated Jan. 2, 2018", (W/ English Claims), 6 pgs.

"Chinese Application Serial No. 201510523410.9, Response Filed Oct. 19, 2017 to Office Action dated Jun. 12, 2017", (W/ English Claims), 11 pgs.

"Taiwanese Application Serial No. 104127012, Office Action dated Oct. 19, 2016", W/ English Translation, 15 pgs.

"Taiwanese Application Serial No. 104127012, Response filed Jan. 19, 2017 to Office Action dated Oct. 19, 2016", w/ English Claims, 15 pgs.

TRAJECTORY MODIFICATION TECHNIQUE FOR POLAR TRANSMITTER

PRIORITY

This application is a continuation of U.S. patent application Ser. No. 15/243,132, filed Aug. 22, 2016, now issued as U.S. Pat. No. 10,103,758, which is a divisional of U.S. patent application Ser. No. 14/496,519, filed Sep. 25, 2014, now issued as U.S. Pat. No. 9,425,834, which is a continuation-in-part of U.S. patent application Ser. No. 13/763,760, filed Feb. 11, 2013, now issued as U.S. Pat. No. 8,923,434, each of which is incorporated herein by reference in its entirety.

TECHNICAL FIELD

The present subject matter generally relates to communication architectures and, in particular, to apparatus and methods for reducing operating bandwidth.

BACKGROUND

Digital polar transmitter (DPTX) architectures are very attractive for modern radios, because such architectures can provide improved area and power consumption characteristics compared with conventional analog architectures. For a polar transmitter utilizing a signed radius, trajectories which pass through the origin can be handled by switching the sign of the radius path at the moment of the zero crossing. This partly solves a well known problem of polar transmit architectures, where the handling of zero crossing trajectories is one of the main issues. The farther away from the origin the signal trajectory passes the more difficult the definition of the time stamp of the sign change in the polar path. Methods have been developed that use signal processing to force the signal close to the origin. These methods, especially when applied using a current saving low sample rate, have limited accuracy. (e.g., the signal trajectory can pass the origin at some distance, instead of as wanted, through the origin.) Further actions can be taken to try to avoid a sample point that is located very close to the origin. A case where the trajectory passes very close to the origin and one sample point is located close to the perpendicular projection of the origin can render two consecutive phase steps of around 90°. Without special actions, unsigned to signed polar transformation will not give provide an advantage since there is no well-defined time interval to apply the switch of signs in the radius signal.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Experience with signed polar transmitters shows that actions can be taken to ameliorate the PLL from needing to synthesize large phase jumps generation in PLLs can introduce significant error because of the limited dynamic range of the PLL and limited linearity. Actions that can be taken to ameliorate the PLL from needing to synthesize large phase jumps can include forcing the signal trajectory to pass through or close enough to the constellation origin, identifying the zero crossing and introducing the sign swap at the right time. Alternative actions can involve taking measures to avoid a distributed phase step. (e.g., a close to 180° phase step distributed over two consecutive sample points. The inventor has recognized an elegant or simple phase modification method for polar transmitters that reduces PLL operation at bandwidth and linearity extremes.

Figure 1A:
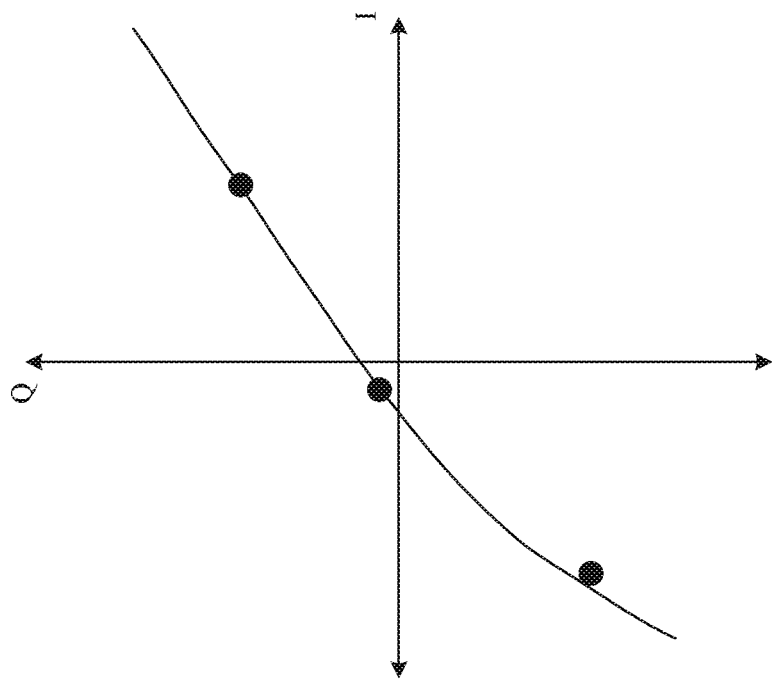
FIGS. 1A and 1B illustrate a signal trajectory that is sampled differently.
Figure 1B:
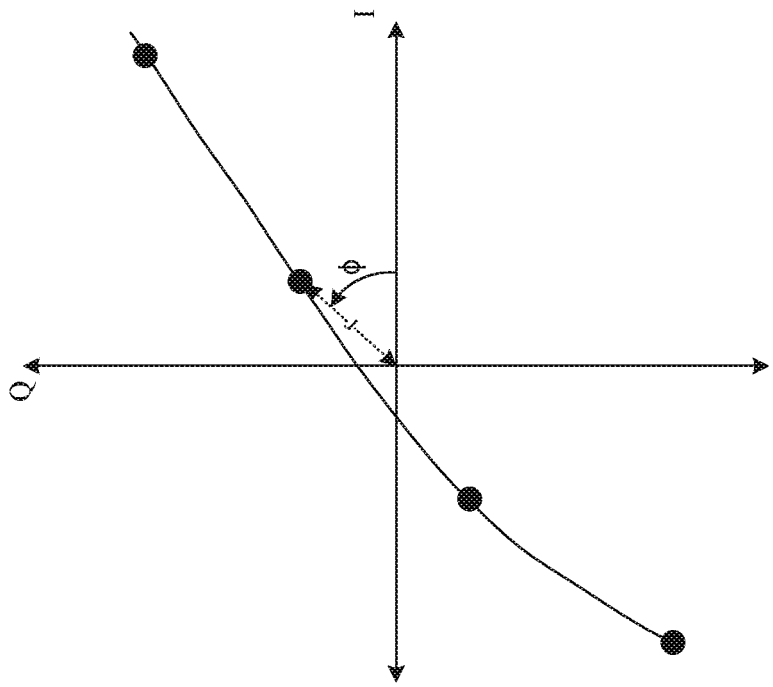

FIGS. 1A and 1B illustrate a signal trajectory that is sampled differently in FIG. 1A compared to FIG. 1B. The samples can represent I and Q symbols but in the present context the present subject matter may be more easily grasped if the trajectories represent samples of radius (r) (or amplitude) and phase symbols ($\varphi$). As plotted, the trajectory passes close by the origin and can profit from a radius sign swap in a signed polar signal representation, at the point where the trajectory is closest to the origin. In FIG. 1, sample points of the trajectory are located such that the origin pass is straightforward to detect in the sampled signal. There is one phase step of almost 180° between two consecutive samples. FIG. 1B illustrates a more difficult case where the sampled phase signal can have two consecutive almost 90° phase steps. Without modification of the signal trajectory a radius sign swap in the sampled signal would not give any significant benefit (this sampling constellation will always result two +/−90° phase steps, regardless if there is no sign swap, two sign swaps, or one sign swap between either of the samples).

Figure 2:
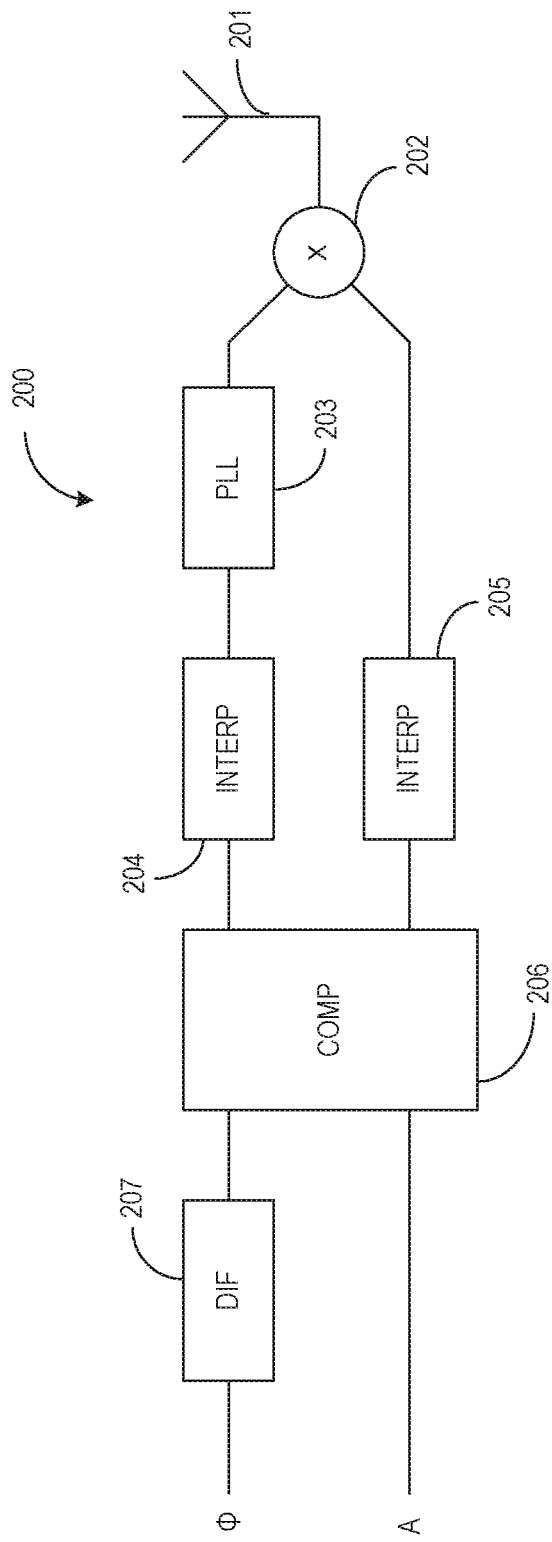
FIG. 2 illustrates generally a block diagram of an example polar transmitter.

FIG. 2 illustrates generally a block diagram of an example polar transmitter 200. The polar transmitter 200 can include an antenna 201 for wireless transmission of communication information, a radio frequency (RF) digital-to-analog converter (DAC) 202, a phase lock loop (PLL) circuit 203, phase and amplitude interpolators 204, 205, a compensation circuit 206, and a phase differentiator circuit 207. In certain examples, the polar transmitter 200 can receive transmission information in the form of polar symbols or polar information including amplitude information (A) and phase information ($\phi$). In some examples, a baseband processor can provide the transmission information. In certain examples, a baseband processor can provide the transmission information in Cartesian symbols (I, Q) and the polar transmitter 200 can include a coordinate rotation digital computer (CORDIC) to translate the Cartesian symbols (I, Q) to the polar symbols or information (A, $\phi$). In certain examples, the polar transmitter 200 can include a phase processing path (203, 204, 206, 207) for the phase information ($\phi$) and an amplitude processing path (205, 206) for the amplitude (A) or radius information. In some examples, the phase processing path can include a phase lock loop (PLL) to provide phase modulation of the carrier signal based on the phase information (φ) or frequency information derived from the phase information (φ). In certain examples, the phase processing path can include a phase differentiator circuit 207 to derive frequency samples from the phase information (φ). In some examples, the phase processing path and the amplitude processing path can each include an interpolator circuit (204, 205) for up-sampling or down-sampling the phase, frequency or amplitude information. In certain examples, the phase modulated carrier signal output from the PLL 203 and the processed amplitude information can be combined using the RFDAC 202 to provide the radio frequency transmission signal for broadcast using the antenna 201.

As briefly discussed above, the PLL 203 can synthesize phase jumps using the phase (φ) or frequency information. Large phase jumps can be difficult if not impossible to accurately synthesize due to bandwidth or dynamic range limitations and linearity issues of the PLL 203. In certain trajectories, as an trajectory approaches zero and then climbs, it can be very difficult to interpolate accurately when the phase value crosses the zero phase line and at what amplitude or at what timestamp. The farther away from the origin the signal trajectory passes the more difficult is the definition of the timestamp of the sign change in the amplitude processing path. In certain existing techniques, such as Cartesian signal processing techniques, the trajectory is modified to ideally pass through the origin. However, such processing methods can have limited accuracy especially when using current-saving, low sample rate circuits and algorithms. Large phase jump processing has been further complicated with the introduction of increased transmit bandwidths and new signal modulation schemes such as LTE, multi-cluster transmission, and LTE carrier aggregation. At the same time, mobile device users desire more power friendly devices such as those that use current efficient algorithms.

The present inventor has recognized an elegant method of forcing the trajectory of a signed polar transmitter through the origin while producing only small degradation of the transmit quality. The technique allows for simple amplitude sign change in the modified trajectory instead of large phase steps. In certain examples, the method can include monitoring the phase information prior to a sign conversion of the amplitude information. In certain examples, if a large phase difference is detected over two sample intervals that are defined, for example by three phase samples, the middle phase sample can be modified, adjusted or changed to create one small phase change and a one large phase change over the two sample intervals. In some examples, the modification can be implemented by setting the phase value of the middle phase sample equal to the phase value of either of the other phase samples. This ensures that of the two phase differences over the two sample intervals, one phase change is equal to zero and the other is large enough to utilize a simple sign or polarity change of the amplitude or radius. In some examples, in addition to setting the phase equal to one or the other sample points and additional phase adjustment of 180 degrees can be added to the middle phase sample. For both of the above modifications, the amplitude or radius value associated with the middle sample can remain unchanged or unmodified.

In certain examples, the choice of which phase value to assign to the middle phase sample can be determined by any number of methods, such as choosing the sample that has a phase angle closer to the phase angle of the middle sample, choosing the sample that has a phase angle furthest the phase angle of the middle sample, choosing the sample that has an amplitude closer to the amplitude of the middle sample. In some examples, a mean value or higher order interpolation can be used to select the phase angle of the middle sample, the amplitude of the middle sample or both the phase angle and the amplitude of the middle sample. In certain examples, the method to select the modified trajectory could be extended to include more than three samples. For example, FIG. illustrates a straight forward modification of phase angles of four samples to have the trajectory pass through the origin. The samples are placed on a straight line passing through the origin, by only changing the phase values of the samples, which can be a simple process in the polar domain. This is just one example of aligning the phase samples to achieve an origin passing trajectory.

Figure 3:
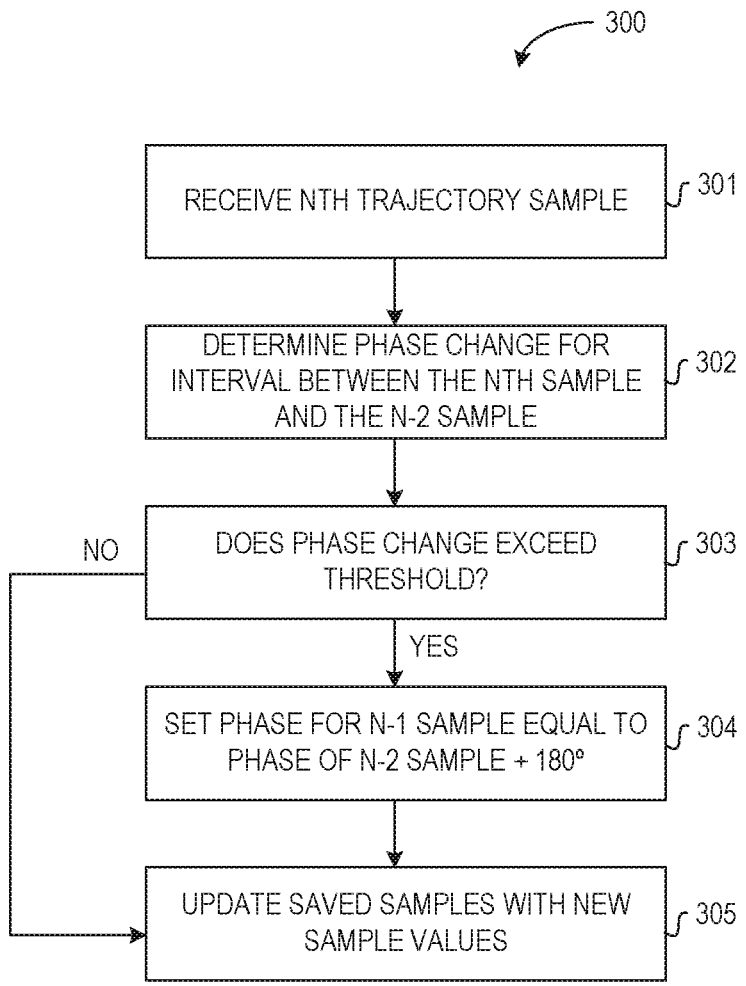
FIG. 3 illustrates generally a flowchart of an example method for modifying a trajectory of communication information samples to limit bandwidth of a transmitter PLL.

FIG. 3 illustrates generally a flowchart of an example method 300 for modifying a trajectory of communication information samples to limit bandwidth of a transmitter PLL. At 301, the method can include receiving a latest ($N^{th}$) communication phase and amplitude sample, where N is an integer greater than 2. At 302, a phase change can be determined by subtracting the $N^{th}$ phase value from a stored N−2 phase value sample. In certain examples, the phase change can be limited to an absolute phase change between 0 and π radians or 0 and 180 degrees. At 303, the phase change can be compared to a threshold value. At 304, if the phase change is greater than the threshold value, the phase value of the N−1 sample can be changed to the phase value of the N−2 sample plus or minus π. This change can assure that the trajectory passes through the origin. In some examples, the addition of the subtraction of π can be optional or excluded. In some examples, as discussed above, the N−1 sample phase value can be set equal to the phase value of the $N^{th}$ sample plus or minus π. At 305, the current sample can be stored and the stored sample information can be updated in anticipation of receiving the next sample (N+1). In certain examples, more than one sample can be modified to align the samples along a line passing through the origin. In some examples, modifying the sample information of more than one sample to align the samples along a line passing through the origin can include only changing the phase information of each sample.

Figure 4:
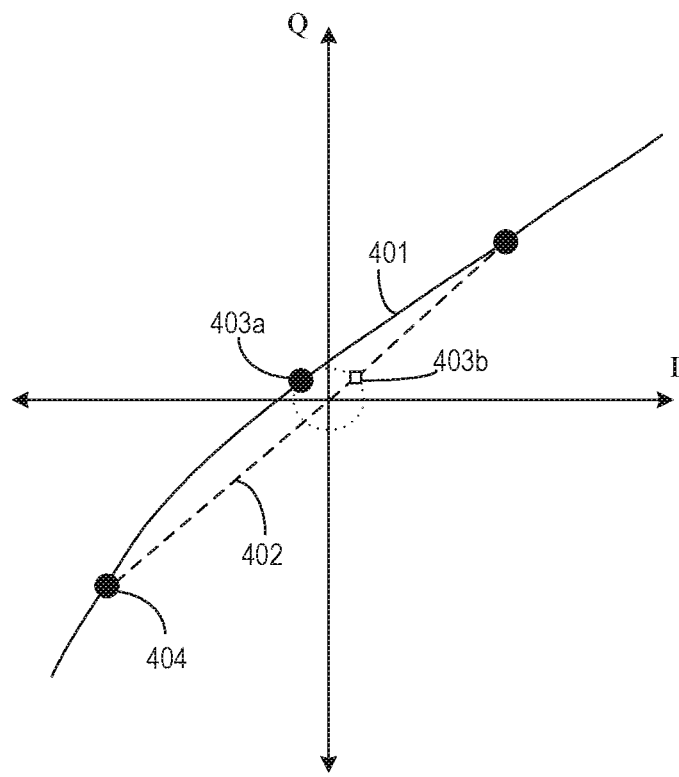
FIG. 4 illustrates the trajectory of FIG. 1B with the modified trajectory that results from changing the phase value of a middle sample that defines two sample intervals as discussed above.

FIG. 4 illustrates the trajectory 401 of FIG. 1B with the modified trajectory 402 that results from changing the phase value of a middle sample that defines two sample intervals as discussed above. The unmodified trajectory 401, for example, moving from left to right, would require the PLL to make two nearly 90 degree phase jumps. The modified trajectory changes the phase value of the unmodified middle sample 403a, while keeping the amplitude the same. The illustrated modification set the phase value of the modified middle sample 403b to the phase of the left-most sample 404 plus 180 degrees. The modified trajectory 402 can be implemented in the polar transmitter with a small phase jump at the modified middle sample 403b and a sign change of the amplitude. The modification does introduce error, however, the modification is done close to the origin where the signal is small and the error is also small. It is noted, that as the phase change threshold value increases, the error decreases. As discussed above, the addition or subtraction of 180 degrees is optional.

Figure 5:
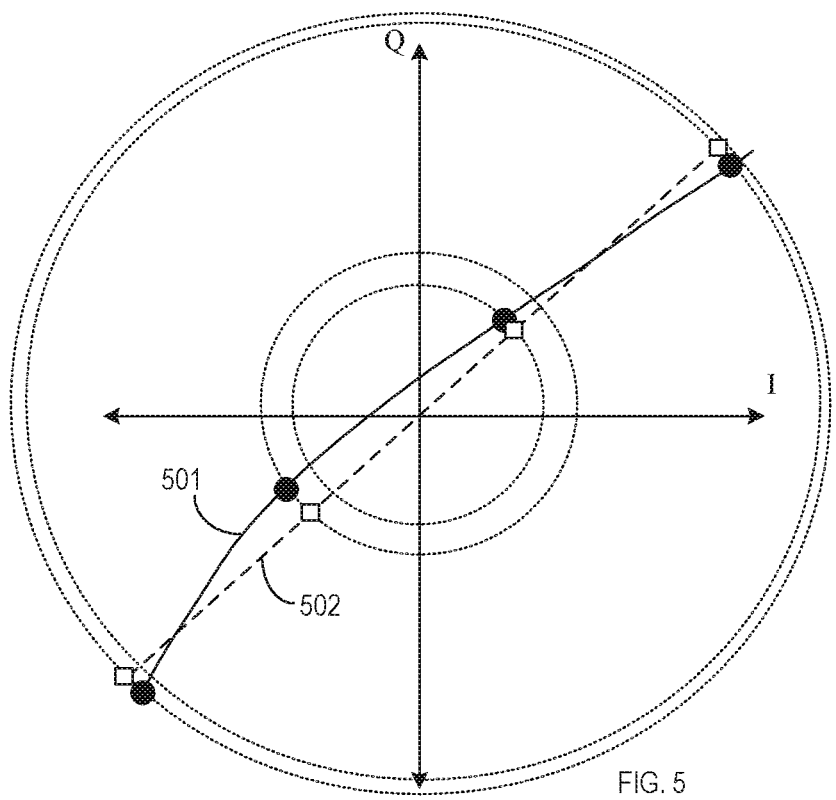
FIG. 5 illustrates the trajectory of FIG. 1A with a modified trajectory where more than one sample is modified to have the trajectory pass through the origin.

FIG. 5 illustrates the trajectory 501 of FIG. 1A with a modified trajectory 502 where more than one sample is modified to have the trajectory pass through the origin. In certain examples, such as that illustrated, the trajectory 501 can be modified by changing only the phase information of each sample and not the amplitude information. Some benefits of modifying the trajectories according the present subject matter include, but are not limited to, reducing the bandwidth operation of the PLL, working within more linear operating range of the PLL, and being able to implement the modification in much simpler and energy-efficient circuits compared to Cartesian modification schemes that force the trajectory through the origin.

EXAMPLES AND ADDITIONAL NOTES

In Example 1, a method for modifying transmission sample trajectory can include receiving a first sample for a signed polar transmitter, determining an absolute phase angle change between the first sample and a third sample, if the first angle change is greater than a threshold phase angle, adjusting phase information of a second sample to provide a modified second sample such that a trajectory associated with the first sample, the modified second sample and the third sample passes through an origin, the origin defined by a zero radius value, and wherein the second sample is received prior to receiving the first sample, and the third sample is received prior to receiving the second sample.

In Example 2, the method of Example 1 optionally includes changing the sign of amplitude information of the second sample to provide the modified second sample.

In Example 3, the amplitude information of the second sample of any one or more of Examples 1-2 optionally is not adjusted to provide the modified second sample.

In Example 4, the adjusting the phase information of any one or more of Examples 1-3 optionally includes setting the phase information of the modified second sample equal to phase information of the first sample.

In Example 5, the adjusting the phase information of any one or more of Examples 1-4 optionally includes setting the phase information of the modified second sample equal to phase information of the first sample plus 180 degrees.

In Example 6, the adjusting the phase information of any one or more of Examples 1-5 optionally includes setting the phase information of the modified second sample equal to phase information of the first sample minus 180 degrees.

In Example 7, the adjusting the phase information of any one or more of Examples 1-6 optionally includes setting the phase information of the modified second sample equal to phase information of the third sample.

In Example 8, the adjusting the phase information of any one or more of Examples 1-7 optionally includes setting the phase information of the modified second sample equal to phase information of the third sample plus 180 degrees.

In Example 9, the adjusting the phase information of any one or more of Examples 1-8 optionally includes setting the phase information of the modified second sample equal to phase information of the third sample minus 180 degrees.

In Example 10, the threshold phase angle of any one or more of Examples 1-9 optionally is 90 degrees or greater.

In Example 11, the threshold phase angle of any one or more of Examples 1-9 optionally is 135 degrees or greater.

In Example 12, a signed polar transmitter can include a radio frequency digital to analog converter (RFADC) configured to receive phase modulation information and processed amplitude information and to provide a radio frequency transmission signal for broadcast using an antenna, a phase lock loop (PLL) configured to receive processed phase information and to provide the phase modulation information, and a compensation circuit configured to receive phase transmit information and amplitude transmit information, to modify the phase transmit information and the amplitude transmit information to provide the processed phase transmit information if an absolute phase angle change of two consecutive phase samples of the phase transmit information is greater than a threshold.

In Example 13, the compensation circuit of any one or more of Examples 1-12 optionally is configured to change a polarity of the amplitude information of the second phase sample to provide the processed amplitude information.

In Example 14, the compensation circuit of any one or more of Examples 1-13 optionally is configured to set the phase transmit information of a second phase sample of the two consecutive phase samples equal the phase transmit information of a first phase sample of the two consecutive phase samples, wherein the second phase sample is received prior to receiving the first phase sample.

In Example 15, the compensation circuit of any one or more of Examples 1-14 optionally is configured to set the phase transmit information of a second phase sample of the two consecutive phase samples equal the phase transmit information of a first phase sample of the two consecutive phase samples plus 180 degrees, wherein the second phase sample is received prior to receiving the first phase sample.

In Example 16, the compensation circuit of any one or more of Examples 1-15 optionally is configured to set the phase transmit information of a second phase sample of the two consecutive phase samples equal the phase transmit information of a third phase sample, wherein the second phase sample is received prior to receiving a first phase sample of the two consecutive phase samples, and the third phase sample is received prior to receiving the second sample.

In Example 17, the compensation circuit of any one or more of Examples 1-16 optionally is configured to set the phase transmit information of a second phase sample of the two consecutive phase samples equal the phase transmit information of a third phase sample plus 180 degrees, wherein the second phase sample is received prior to receiving a first phase sample of the two consecutive phase samples, and the third phase sample is received prior to receiving the second sample.

In Example 18, the compensation circuit of any one or more of Examples 1-17 optionally is configured to not change a polarity of the amplitude information of the second phase sample to provide the processed amplitude information.

In Example 19, the threshold phase angle of any one or more of Examples 1-18 optionally is 90 degrees or greater.

In Example 20, the threshold phase angle of any one or more of Examples 1-18 optionally is 135 degrees or greater.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A signed polar transmitter comprising:
   a radio frequency digital to analog converter (RFDAC) configured to receive phase modulation information and processed amplitude information and to provide a radio frequency transmission signal for broadcast using an antenna;
   a phase generator configured to receive processed phase information and to provide the phase modulation information; and
   a compensation circuit configured to receive phase transmit information and amplitude transmit information for three consecutive trajectory samples of an original trajectory path, referenced to an origin, of the radio frequency transmission signal, and to modify the phase transmit information of a single, time-wise middle sample of the three consecutive trajectory samples to generate the processed phase transmit information,
   wherein the phase transmit information is modified to match the phase transmit information of one of the other trajectory samples of the three consecutive trajectory samples; and
   wherein a modified trajectory path associated with the processed phase transmit information is closer to the origin than the original trajectory path.

2. The signed polar transmitter of claim 1, wherein the compensation circuit is configured to change a polarity of the amplitude information of the time-wise middle sample to generate the processed amplitude information.

3. The signed polar transmitter of claim 1, wherein the compensation circuit is configured to set the phase transmit information of the time-wise middle sample equal to the phase transmit information of a first sample of the three consecutive trajectory samples, wherein the time-wise middle sample is received prior to receiving the first sample.

4. The signed polar transmitter of claim 1, wherein the compensation circuit is configured to set the phase transmit information of the time-wise middle sample equal to the phase transmit information of a first sample of the three consecutive trajectory samples plus about 180 degrees, wherein the time-wise middle sample is received prior to receiving the first sample.

5. The signed polar transmitter of claim 1, wherein the compensation circuit is configured to set the phase transmit information of the time-wise middle equal to the phase transmit information of a third sample of the three consecutive trajectory samples, wherein the time-wise middle sample is received prior to receiving a first sample of the three consecutive trajectory samples, and the third sample is received prior to receiving the time-wise middle sample.

6. The signed polar transmitter of claim 1, wherein the compensation circuit is configured to set the phase transmit information of the time-wise middle equal to the phase transmit information of a third sample of the three consecutive trajectory samples plus about 180 degrees, wherein the time-wise middle sample is received prior to receiving a first sample of the three consecutive trajectory samples, and the third sample is received prior to receiving the timewise middle sample.

7. The signed polar transmitter of claim 1, wherein the compensation circuit is configured to not change a polarity of the amplitude information of the time-wise middle sample to generate the processed amplitude information.

8. The signed polar transmitter of claim 1, wherein the phase generator is a phase lock loop.

9. A non-transitory device readable storage medium comprising instructions thereon that, when executed by a processor, cause the processor to perform operations comprising:
   receiving a first sample for a signed polar transmitter after receiving a second sample;
   determining an absolute phase angle change between the first sample and a third sample that is received prior to the second sample;
   if the absolute angle change is greater than a threshold phase angle, adjusting phase information of the second sample to provide a modified second sample, wherein e a trajectory associated with the first sample, the modified second sample and the third sample passes through an origin defined by a zero radius value.

10. The device readable storage medium of claim 9, including instructions to perform operations including changing the sign of amplitude information of the second sample to provide the modified second sample.

11. The device readable storage medium of claim 9, wherein the amplitude information of the second sample is not adjusted to provide the modified second sample.

12. The device readable storage medium of claim 9, wherein adjusting the phase information includes setting the phase information of the modified second sample equal to phase information of the first sample.

13. The device readable storage medium of claim 9, wherein adjusting the phase information includes setting the phase information of the modified second sample equal to phase information of the first sample plus about 180 degrees.

14. The device readable storage medium of claim 9, wherein adjusting the phase information includes setting the phase information of the modified second sample equal to phase information of the first sample minus about 180 degrees.

15. The device readable storage medium of claim 9, wherein adjusting the phase information includes setting the phase information of the modified second sample equal to phase information of the third sample.

16. The device readable storage medium of claim 9, wherein adjusting the phase information includes setting the phase information of the modified second sample equal to phase information of the third sample plus about 180 degrees.

17. The device readable storage medium of claim 9, wherein adjusting the phase information includes setting the phase information of the modified second sample equal to phase information of the third sample minus about 180 degrees.

18. The device readable storage medium of claim 9, wherein the threshold phase angle is 90 degrees or greater.

19. The device readable storage medium of claim 9, wherein the threshold phase angle is 135 degrees or greater.

\* \* \* \* \*